INVENTOR
JEROME R. SINGER

ATTORNEYS.

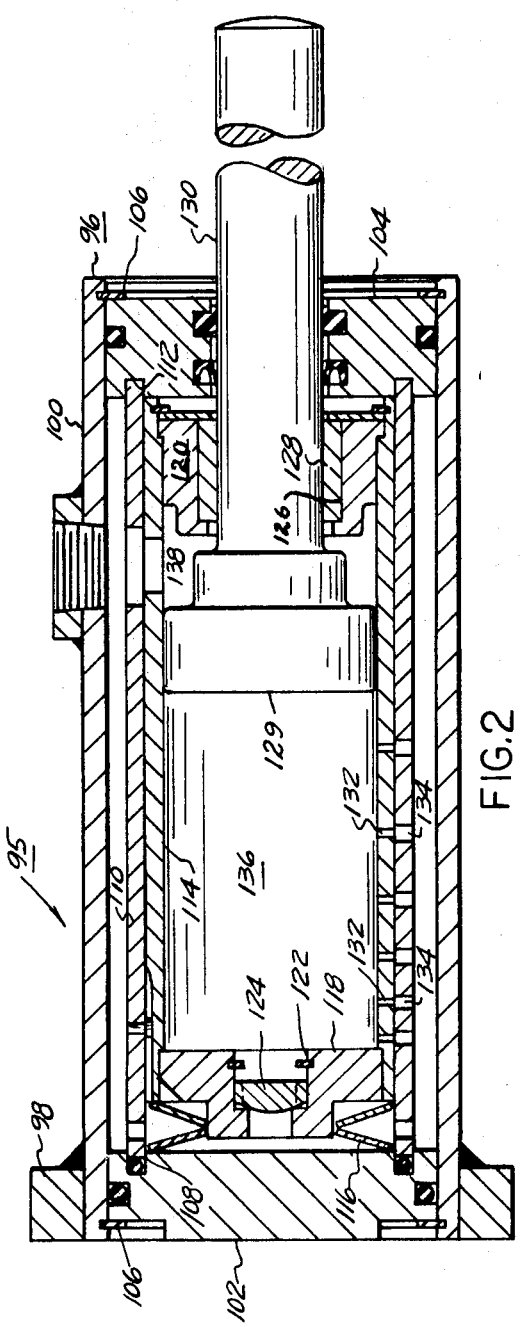
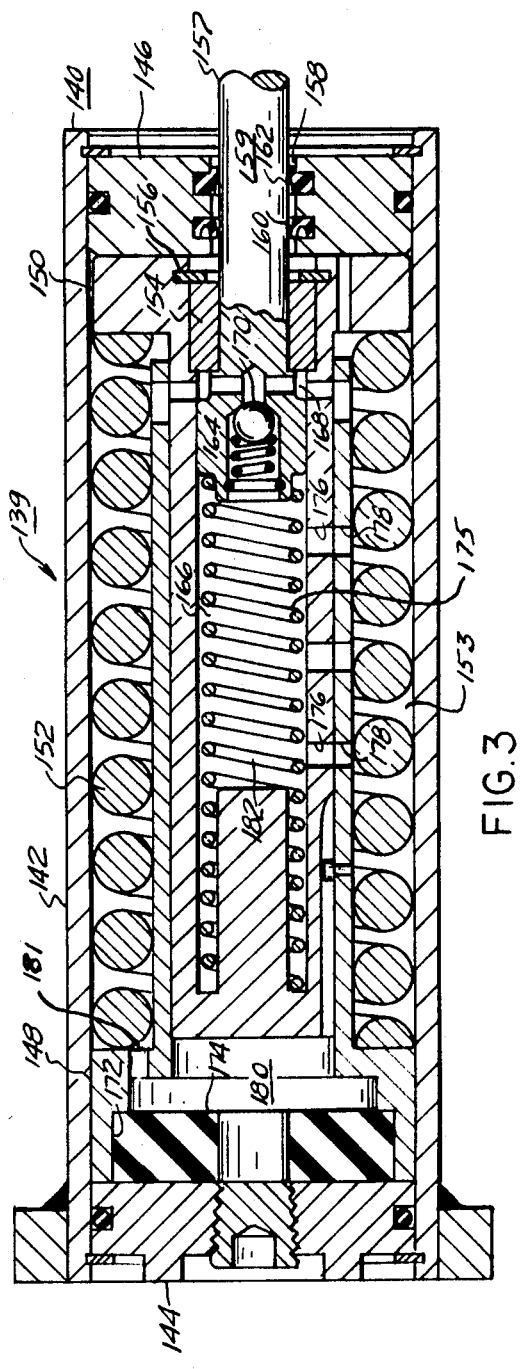

INVENTOR
JEROME R. SINGER

BY Hauke, Krass, Gifford, & Patalidis

ATTORNEYS

United States Patent Office 3,605,960
Patented Sept. 20, 1971

3,605,960
AUTOMATICALLY ADJUSTABLE SHOCK ABSORBERS
Jerome R. Singer, 9916 Nottingham,
Detroit, Mich. 48224
Filed May 27, 1969, Ser. No. 828,168
Int. Cl. F16f 9/50
U.S. Cl. 188—287                    20 Claims

ABSTRACT OF THE DISCLOSURE

A fluid pressure shock absorber of the type having a cylinder with a piston slidably mounted therein separating the cylinder into variable volume chambers, the piston movement decreasing the size of one of the chambers in response to the shock load exerted thereon creating a pressure in such chamber which is a function of the shock load. A plurality of spaced apart ports in the cylinder connect the chambers through which fluid is forced from one chamber to the other wherein the rate of said fluid flow controls deceleration of the piston as a shock load is dissipated; and including means for automatically varynig the rate of fluid flow through the ports as a function of a pressure force in said one chamber.

BACKGROUND OF THE INVENTION

(I) Field of the invention

This invention relates generally to shock absorbers and more particularly to an adjustable fluidic shock absorber which is capable of being adjusted to absorb shock loads of varying energies from low shock loads to high shock loads, said adjustment being automatic as a function of said shock loads.

More specifically this invention relates to improvements in fluidic shock absorbers of a linear type described in the patents to W. J. Chorkey, No. 3,168,168, to G. F. Kenworthy, No. 3,344,894, and various types of non-linear decelerators.

(II) Description of the prior art

Fluidic shock absorbers of the type described in the Chorkey patent and the like comprise an outer tube adapted to be connected to a source of hydraulic oil under pressure, an inner tube disposed in the outer tube and spaced apart therefrom and in which is slidably mounted a piston and rod assembly for receiving a shock load, the inner tube being adapted to receive hydraulic oil under pressure from said outer tube and being provided with a plurality of hydraulic oil escape ports, and wherein the degree of opening of the ports is varied by means of an adjustable member rotatably mounted on the inner tube to control the deceleration of the piston and rod assembly when it is moved inwardly in the inner tube to dissipate the shock load by forcing the oil from the inner tube into the outer tube through the escape ports. Although such device has overcome the disadvantages of providing a separate shock absorber for each type of application requiring different responses to various shock loads, it does not permit one shock absorber to be utilized over a wide range of impact velocity, inertia means, loads, and propelling forces without prior manual adjustments.

SUMMARY OF THE INVENTION

The present invention comprises a fluidic shock absorber which provides a controlled deceleration of a moving object or for stopping a moving object at a controlled rate of deceleration. This is provided by means of a fluidic shock absorber which includes an outer tube adapted to be connected to a source of pressure fluid and an inner tube in which is slidably mounted a piston and rod assembly which separates the inner tube into variable volume chambers; the piston and rod assembly receiving a shock load and compressing one of the chambers in response to the shock load, thereby creating a pressure force in said one chamber; said one chamber having formed wherein a plurality of spaced apart ports through which fluid is forced therefrom to the other of said chambers when the piston is moved in response to the shock load; restrictive means associated with the ports and movable relative thereto for providing continuous control thereof between a maximum opening of the ports for low piston loads and minimized opening of the ports for high piston loads, and pressure responsive means coupled to the restrictive means for varying the effective flow area of said ports as a function of the pressure in said one chamber.

It is therefore an object of this invention to provide a fluidic shock absorber which automatically controls the rate of deceleration of the piston and rod assembly therein as a function of the pressure within the shock absorber or energy being absorbed.

It is also an object of this invention to provide such a shock absorber which will permit utilization thereof in circumstances having widely varying reactions.

DESCRIPTION OF THE DRAWINGS

Other applications, objects and advantages of the present invention will be made apparent by the following detailed description of several preferred embodiments thereof. The description makes reference to the accompanying drawings in which like reference characters refer to like parts throughout the several views and in which:

FIG. 2 is a longitudinal section of another form of the invention showing the inner tube being movable relative to the outer housing;

FIG. 3 is a longitudinal sectional view of another form of the invention in which the inner tube is also movable, and showing an accumulator means in combination with the shock absorber and located therein;

DESCRIPTION OF THE PREFERRED EMBODIMENTS

Figure 1:
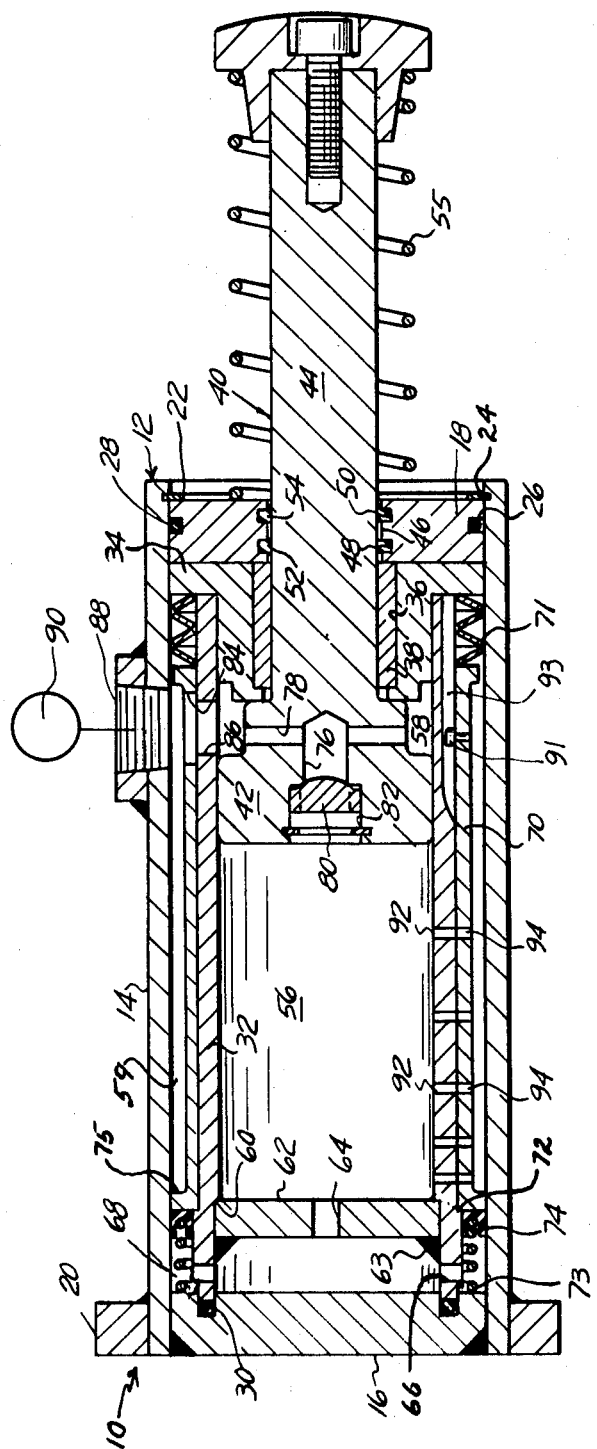
FIG. 1 is a longitudinal section of a shock absorber incorporating a preferred form of the present invention.
Figure 5:
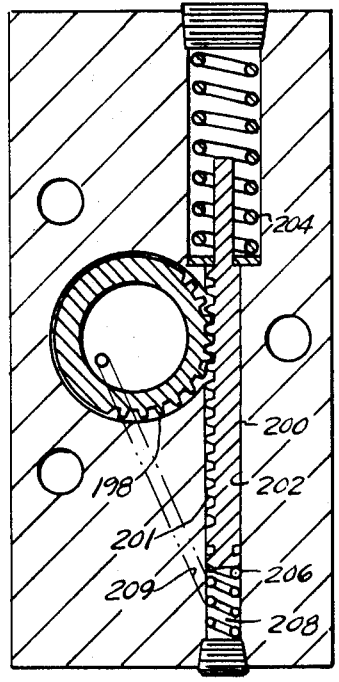
FIG. 5 is a transverse sectional view taken along line 5—5 of the embodiment disclosed in FIG. 4.

Referring to FIG. 1, a preferred fluidic shock absorber indicated by the numeral 10 is shown as an illustrative embodiment of the inventive principles comprising a housing 12 including an outer tube section 14 enclosed on opposite ends by means of cylinder caps 16 and 18.

The base end of the housing 12 of the shock absorber is preferably carried on a mounting pad 20 for mounting the shock absorber in an operative position. The mounting pad 20 and the cylinder cap 16 are respectively secured to the outer and inner sides of the outer tube 14 by any suitable means such as by welding. The cylinder cap 18 is retained in the front end of the outer tube 14 by a retainer ring 22 or the like snapped in place in a groove 24. The cylinder cap 18 is provided with a circumferential groove 26 for an O ring seal 28.

The base end cylinder cap 16 has an inner annular groove 30 in which is mounted the base end of an inner tube 32 which is held in position by a front end support member 34 which in turn is retained securely by means of the front end cylinder cap 18. The support member 34 has an axial bore 36 in which is mounted a journal bearing 38 adapted to receive and provide lateral support for a piston and rod assembly 40. The piston 42 of the assembly 40 is slidably mounted and in a fluid sealing relationship with the inner surface of tube 32 while the rod 44 of the assembly 40 is slidably mounted and supported by the aforementioned journal bearing 38. The rod 44 extends through a bore 46 formed in the cylinder cap 18 wherein a wiper 50 and an O ring 48 are provided in grooves 54 and 52 respectively for the purpose of cleaning the rod 44 and preventing fluid leakage. A spring 55 is disposed between the end of rod 44 and the cylinder cap 18 so as to bias the piston and rod assembly 40 outwardly from the inner tube 32. Although the spring 55 is illustrated for providing a means for biasing the piston and rod assembly 40 outwardly from the inner tube 32, any suitable return mechanism may be utilized.

The piston 42 divides the space within the inner tube 32 into two variable volume chambers, respectively designated by the numerals 56 and 58, the chamber 56 being on the left hand side of the piston 42 whereas the chamber 58 is on the right hand side.

A wall disk 62 seated on a shoulder 60 formed on the inner side of the inner tube 32 separates the variable chamber 56 from the end cap 16 and is secured in place by any suitable means such as by welding as at 63. The chamber 56 communicates with a space 68 formed between the inner and outer tubes through an axial bore 64 extending through the disk 62 and a radial bore 66 extending through the inner tube 32.

An intermediate tube 70 provided between the inner and outer tubes 32 and 14 is concentric with and axially slidable on the outer surface of the inner tube 32 and its leftward movement is constrained by means of a shoulder 72 formed on the outer side of the inner tube 32. Belleville type springs 71 disposed between the forward end of the intermediate tube 70 and the support member 34 biases the intermediate tube 70 toward the left as shown. A coil type spring 73 having a relatively low spring rate is provided between the base end of the intermediate tube and the cylinder cap 16 to maintain a U-cup driver 74 against a base flange 75 on the intermediate tube and in fluid sealing relationship between the inner and outer tubes. Fluid pressure from the chamber 56 communicated to the space 68 by means of the axial and radial bores 64 and 66 exerts pressure against the U-Cup driver 74 when the piston 42 moves inwardly toward the left, as will be described.

The chambers 56 and 58 are in fluid communication through bores 76 and 78 respectively extending axially and radially through the piston 42. A hemispherical check valve 80 is carried in an enlarged section 82 of the axial bore 76 to permit fluid communication from the chambers 58 and 59 to the chamber 56 when the piston and rod assembly is being withdrawn from the chamber 56, that is, when there is an expansion of the chamber 56. When there is a compression of the chamber 56 by means of the piston and rod assembly moving inwardly toward the disk 62, the check valve 80 closes to prevent fluid communication between the chambers.

The chambers 58 and 59 are in fluid communication through radial bores 84 and 86 respectively extending through the intermediate and inner tubes. A threaded port 88 provided in the outer tube 14 connects the chambers 58 and 59 with an accumulator or the like indicated schematically at 90, the accumulator providing an expansion volume for fluid displaced by the intrusion of the piston rod 44 into the chamber 58. Thus fluid is able to flow from chamber 59 and/or from the accumulator 90 into chamber 58 at all times to prevent a vacuum from being formed within the chambers when the piston is retracting.

As illustrated in FIG. 1, the inner tube has a plurality of radial axially spaced ports 92. The intermediate tube also has a plurality of axially spaced ports 94 in substantially radial alignment with the inner tube ports 92 when the intermediate tube abuts the shoulder 72.

The ports 92 and 94 are illustrated as being of a circular shape, however, any shape may be utilized, such as teardrop shaped ports, elongated slots or the like.

A pin 91 extending from the intermediate tube 70 engages an elongated slot 93 formed in the inner tube 32 for maintaining a proper angular alignment between the ports 92 and 94 while permitting relative movement of the inner and intermediate tubes in an axial direction.

In use, the shock absorber 10 of the present invention, filled with oil, hydraulic fluid or the like, will be conveniently mounted so that the piston and rod assembly 40 can be moved inwardly by an apparatus engaged by the cylinder rod 44 for decelerating or absorbing shock blows from the apparatus.

When the piston and rod assembly 40 is in the position shown in FIG. 1 the shock absorber is in a position to receive and dissipate a shock blow. The rod 44 receives the shock blow and starts to dissipate the shock blow as the piston 42 moves inwardly to compress the chamber 56. As the piston and rod assembly 40 continue to move inwardly the piston successively closes off the ports 92 reducing the total cross-sectional fluid exhaust area thereof. The piston and rod assembly 40 thus decelerates as the piston 42 closes off the successive escape paths for the fluid in the inner tube chamber 56.

The instantaneously regulated size and the shape and number of the ports 92 metering fluid into the chamber 59 between the inner and outer tubes, as well as the piston area and stroke determines the energy absorption capacity of the piston and rod assembly 40 when it is moved inwardly to compress the chamber 56.

As hereinbefore mentioned pressure fluid in the chamber 56 communicates with the space 68 through the passageways 64 and 66. The fluid pressure acts upon the U-cup 74 to urge the U-cup 74 and simultaneously the intermediate tube 70 in a rightward direction against the force of the Belleville springs 71. This rightward movement of the intermediate tube 70, which is a function of the pressure in the chamber 56, will move the intermediate ports 94 out of radial alignment with the inner tube ports 92 further restricting the effective flow area therethrough. The greater the shock load in the piston 44, the faster pressure increases in the chamber 56 and the faster the reaction of the intermediate tube 70 in reducing the effective area of the ports 92. By proper design of the annular area exposed to pressure at the U-cup 74, by proper sizing of the flow areas through the ports 92 and 94, and by proper sizing of the biasing means at 71, a predetermined range of expected loads on the piston and rod assembly 40 can be dissipated before the piston hits the inner surface of the disc 62.

For example, the springs 71 may be preloaded so that the device is only operative to change the size of the ports 92 through a range of shock loads which creates a pressure in the chambers 56 and 68 that exceeds a predetermined value.

The device may be of such a design to allow a complete closing of the port 92 when it is desirable to utilize the compressibility of the fluid as a means of absorbing energy of extremely high loads such as it required in aircraft landing gear or the like.

When the movement of the piston and rod assembly 40 has been stopped, and the load removed, the assembly will be urged by the spring 55 outwardly to its original position as shown in FIG. 1 to receive the next shock absorbing operation. At the same time the fluid from the accumulator 90 flows through axial bores 84 and 86 into the low pressure chambers 58 and 59 and via the bores 76 and 78 into the chamber 56. The area differential between opposite sides of the piston 42 is such that the force balance resulting from accumulator 90 pressure acting on opposite sides of the piston and/or the force of the spring 55 will tend to drive the piston outwardly. With the energy dissipated, the amount of force exerted against the flange 75 of the intermediate tube 70 will be reduced below that of the value exerted by the belleville springs 71 which will shift the intermediate tube to its initial position as illustrated in FIG. 1.

It can be seen that the shock absorber illustrated in FIG. 1 may be used in an application where different size loads can be applied without any manual adjustments being made to the size of the ports 92 over which the fluid must escape to control the deceleration of the piston. The escape of fluid through the ports 92 and thus the energy absorbed by the piston will be determined by the position of the ports 94 which is a function of the pressure acting against the base end of the intermediate tube.

Since the pressure in the chamber 56 is a function of the energy being absorbed by the piston and rod assembly, and the relative position of the ports is determined by that pressure, the size of the flow areas through the ports 92 will be in inverse proportion to the energy exerted against the piston and rod assembly. Thus the energy absorbing capacity of the shock absorber will be automatically adjusted to dissipate different energy levels and that adjustment will be a function of the pressure exerted on the piston and rod assembly. The loads imposed on the piston may be velocity independent, and only mass or inertia dependent. In such situations it may be desirable to provide for an increase in the flow areas through the ports 92 for larger impact masses.

Referring now to FIG. 2 where a shock absorber 95 is shown as another embodiment of the present invention comprising a housing 96 which is carried on a mounting pad 98 for mounting the shock absorber in an operative position. The housing 96 comprises an outer tube 100 enclosed at opposite ends thereof by means of cylinder caps 102 and 104 each of which is secured to the outer tube by any suitable means such as retainers 106. An intermediate tube 110 is maintained in a fixed position relative to the outer tube as it is mounted at its opposite ends within annular grooves 108 and 112 respectively located on the inner sides of the cylinder caps 102 and 104. An inner tube 114 is slidably mounted within the intermediate tube and is biased in a rightward direction by Belleville type springs or other suitable biasing means 116 disposed between the base end of the inner tube and the cap 102. The inner tube 114 is enclosed at opposite ends by discs 118 and 120. Disc 118 is secured on the base end of the inner tube and has a bore 122 extending axially therethrough which has disposed therein a hemispherical check valve 124 to permit fluid communication between the inner and outer tubes. The disc 120 is provided with an axial bore 126 in which there is carried a journalled bearing 128 which is adapted to receive and provide lateral support for a piston 129 and rod assembly 130.

A plurality of spaced ports extending through the inner and intermediate tubes are designated by the numerals 132 and 134 respectively and are in substantial radial alignment when the device is in a minimal energy absorbing mode.

The piston 129 and rod assembly 130 is slidably mounted within the inner tube 114 and separates the tube into two variable volume chambers 136 and 138. When a shock load is applied to the piston and rod assembly the same moves inwardly to compress the chamber 136 and successively closes off the ports 132 in a manner which is similar to the operation of the embodiment disclosed in FIG. 1.

The energy absorption capacity of the shock absorber will be determined by the effective flow areas through the ports 132, and as these areas are decreasesd, the energy absorption capacity of the shock absorber will increase. As the piston advances toward the disc 118, the inner tube will move leftwardly in response to the pressure increase within the chamber 136, compressing the spring 116. This leftward movement will radially misalign the ports 132 and 134 further decreasing the effective flow area therethrough. Thus it can be seen that the embodiment disclosed in FIG. 2 will operate in a manner similar to the embodiment described in FIG. 1 in that any size load within the capacity range of the device applied to the piston and rod will be decelerated at a rate which is a function of the pressure in chamber 136. Spring means, not shown, or accumulator fluid pressure may be provided to return the piston to its initial position after the shock load is dissipated.

Referring now to the embodiment disclosed in FIG. 3 there is shown a shock absorber 139 which comprises a housing 140 having an outer tube 142 enclosed at opposite ends by cylinder caps 144 and 146 in a manner similar to that described for the embodiment disclosed in FIG. 2. Within the outer tube 142 there is disposed a hollow T-shaped intermediate tube 148 in which a second hollow T-shaped inner tube 150 is slidably disposed. A spring 152 in a chamber 153 circumscribing the intermediate tube and disposed between the T-shaped ends of the intermediate and inner tube tends to telescopically separate the inner and intermediate tubes into abutment with the cylinder caps 144 and 146 respectively.

A journal bearing 154 retained in the T-section of inner tube 150 by a retainer 156 provides lateral support for a piston and rod assembly 157, of which the rod 159 extends through a bore 158 formed in the front cylinder cap 146. Suitable wiper and sealing means are provided in the bore 158 and are respectively indicated by means of numerals 162 and 160. The piston 164 is slidably mounted and in fluid sealing engagement with the inner surface of the inner tube and separates the same into two variable volume chambers 166 and 168. The chambers 166 and 168 are in fluid communication through a spring biased ball check valve 170 disposed within the piston.

An accumulator comprising a compressible material 174 is disposed within a recess 172 formed within the intermediate tube T-section 148.

The inner and intermediate tubes are both provided with a plurality of axially spaced ports respectively indicated by the numerals 176 and 178 and function in a manner similar to ports described in the embodiments illustrated in FIGS. 1 and 2.

It will be seen that as a shock load is applied to the piston and rod assembly, the piston 164 will move leftwardly successively closing off the ports 176 and compressing the chamber 166 in which the pressure therein will increase so as to shift, if necesary, the inner tube leftwardly against the spring 152 further decreasing the effective flow rate through the ports 176. It can thus be seen that the device will operate in substantially the same manner as those hereinbefore described.

At the same time the inner tube is shifted leftwardly, the displacement of the fluid in a chamber 180 communicating with the spring chamber 153 through a port 181 will cause the material 174 to be compressed. When the shock load has been dissipated and the piston and rod assembly is returned to its initial position as illustrated in FIG. 3 by mean of a spring 182 disposed within the inner tube, the compressible material 174 will expand and, with the help of a spring 175, will force the fluid back through the check valve 170 to prevent the creation of a vacuum within the chamber 166.

Figure 4:
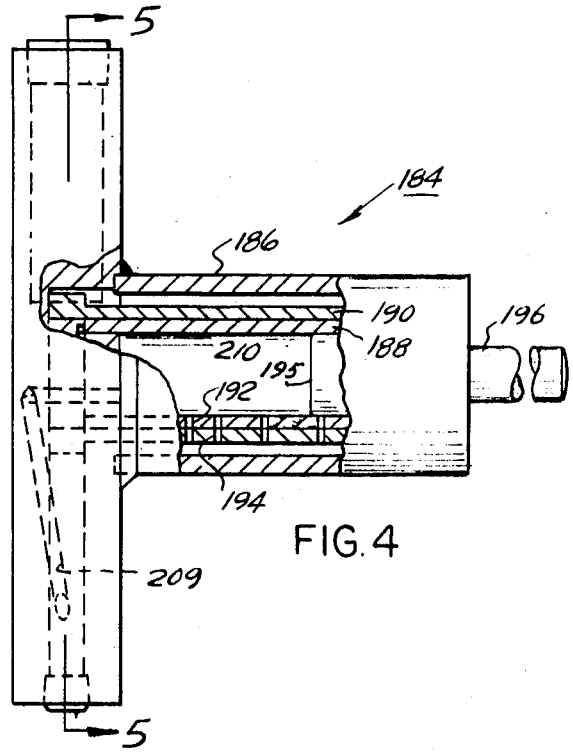
FIG. 4 is a partial sectional view of yet another form of the invention in which the restricting means is rotatably mounted with respect to the inner tube.
Figure 7:
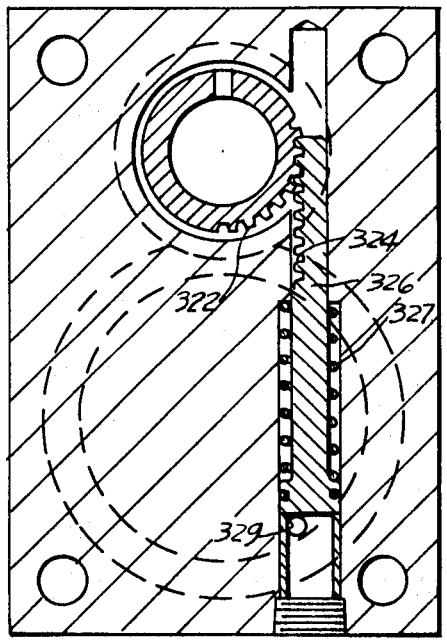
FIG. 7 is a transverse sectional view taken along line 7—7 of the embodiments disclosed in FIG. 6.

Referring now to FIG. 4 there is shown another embodiment of the present invention, a fluidic shock absorber 184 comprising an outer tube 186 having an inner tube 188 and an intermediate tube 190 disposed in a concentric relationship to one another. The tubes 188 and 190 each have a plurality of axially spaced ports indicated by the numerals 192 and 194 in which the adjacent openings are in substantially radial alignment and each of which functions in a manner similar to devices hereinbefore described.

A piston 195 and rod assembly 196 is slidably mounted within the inner tube and separates the inner tube into two variable volume chambers one of which is indicated at 210. As the piston 195 moves inwardly under a shock load the piston 195 will successively close off the ports 192, thus decreasing the rate of flow of the fluid from the inner tube with the resultant effect that the deceleration of the piston remains constant. In the instant embodiment, the intermediate tube has a spline configuration 198 which is adapted to cooperate with a mating spline section 201 formed on an actuator pin 200. The pin 200 is slidably mounted within a bore 202 having a spring 204 on one end thereof which is adapted to oppose the movement of the pin, whereas, the opposite end 206 of the pin is exposed to an expansible pressure chamber 208 which is communicated to the pressure in the inner tube chamber 210 through drilled passageways 209. When a shock load is applied to the piston 195 and rod assembly 196 the same compresses the chamber 210 creating a pressure increase therein which is transmitted to the pin end 206 to shift the pin axially against the spring 204. The pin spline 201 cooperates with the tube spline for rotating the intermediate tube about an axis which is common to both tubes. This rotation of the intermediate tube will move the ports 192 and 194 out of radial alignment further reducing the effective flow area of the ports. Since the pressure increase in the chamber 210 and the amount of misalignment of the ports (and thus the effective flow area of the ports) are a function of the shock load exerted on the piston 195 and rod assembly 196, it can be seen that the embodiment disclosed in FIG. 4 will function in a manner which is similar to the hereinbefore described embodiments.

Figure 6:
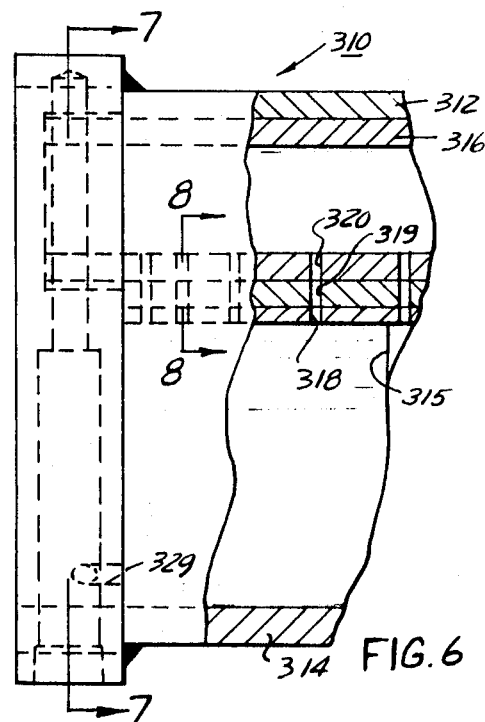
FIG. 6 is a partially sectioned longitudinal fragmentary view of an embodiment in which the restricting means is in a side by side relation with the inner tube.
Figure 8:
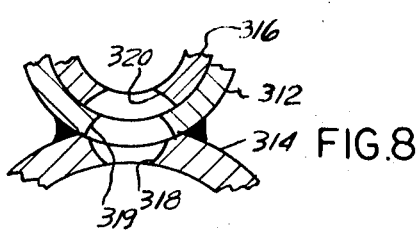
FIG. 8 is a fragmentary sectional view showing the restrictive means taken along a line 8—8 of the embodiment disclosed in FIG. 6.

Referring now to FIG. 6 where there is shown another embodiment of the present invention, a shock absorber 310 comprising a housing 312 having a pair of tubes in a side by side relationship and indicated by the numerals 314 and 316. The tube 314 is adapted to receive a piston 315 and rod assembly, not shown, in a manner similar to those embodiments described hereinbefore. The tubes are in fluid communication through a plurality of ports 318, 319 and 320 formed respectively within the tubes 314, 312 and 316. The effective area of the ports controls the energy absorption capacity of the shock absorber in the same manner as described for the previous embodiments.

In the instant embodiment the tube 316 is rotatably mounted with respect to the tube 314. This is accomplished by means of a spline 322 formed on the base end of the tube 316. The spline 322 is adapted to cooperate with a spline 324 formed on a slidably mounted actuator pin 326. A spring 327 opposes the movement of the pin 326. Drilled passageway 329 provided in the base of the shock absorber 310 communicates the pressure in the tube 314 to one end of the pin 326 whereby the transmitted pressure acts against the pin to shift the same and by means of the spline 324, rotates the tube 316 about its own axis moving the ports 320 out of radial alignment with the ports 318. Thus as the pressure in the inner tube 314 is increased because of the inward movement of the piston 315 and rod assembly, the effective flow area of the ports 318 and 320 can be decreased. It can therefore be seen that the instant device operates in a manner similar to those hereinbefore described.

Figure 9:
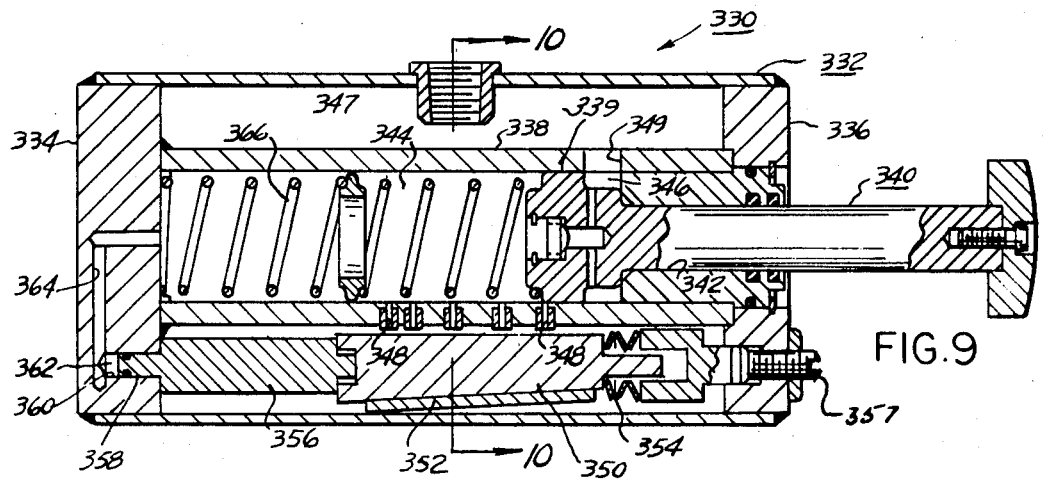
FIG. 9 is a longitudinal sectional view of another embodiment of the present invention showing a wedge shape restricting member in side by side relationship with the inner tube.
Figure 10:
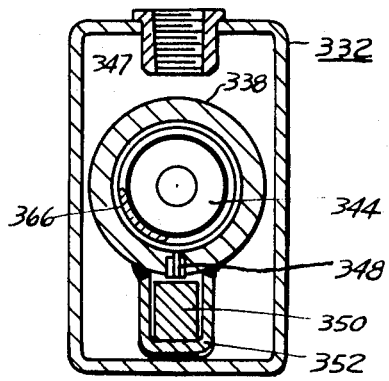
FIG. 10 is a transverse sectional view taken along line 10—10 of the embodiment disclosed in FIG. 9.
Figure 12:
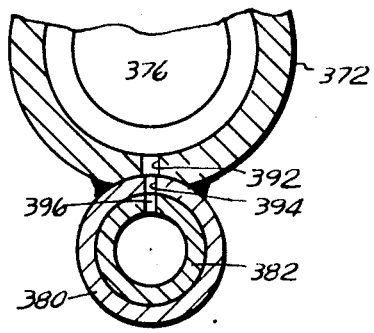
FIG. 12 is a fragmentary sectioned view taken along line 12—12 of the embodiment disclosed in FIG. 11.

Referring now to FIG. 9 where there is shown another embodiment of the present invention, a shock absorber 330 comprising a housing 332 enclosed at its opposite ends by cylinder caps 334 and 336. Mounted within the housing 332 is an inner tube 338 in which there is slidably mounted a piston 339 and rod assembly 340. The rod assembly extends outwardly from the inner tube through a bore 342 formed within the front end cap 336. The slidably mounted piston 339 separates the inner tube into two variable volume chambers which are indicated by numerals 344 and 346.

A plurality of axially spaced ports 348 are provided within the inner tube and communicate the chamber 344 with the chamber 346 by means of a inner tube space 347 and a bore 349. Disposed in a side by side relationship with the inner tube in the intertube space 347 is a wedge shaped member 350 which is adapted for axial movement relative to the ports 348 and abuts an inclined support member 352. The wedge 350 is disposed between Belleville springs 354 or other suitable biasing means at the front end and an actuating member 356 at the base end. The compression of the springs 354 may be adjusted by any means such as an adjusting screw member 357. The actuating member is responsive to the pressure in the chamber 344 to axially shift the wedge 350 in a rightward direction against the springs 354. This is accomplished by means of an extension 358 on the actuating member 356 which telescopcially engages a bore 360 to form within the base cap 334 an expansible pressure chamber 362 which is in fluid communication with the chamber 344 through drilled passageway 364.

As the piston 339 and rod assembly 340 is shifted leftwardly in response to a shock load the piston will succesively close off the ports 348 in the same manner as the other embodiments described hereinbefore. At the time a load is applied to the device the pressure rise in the chamber 344 will be sensed by the expansible chamber 362 creating a force exerted against the extension of the actuating member 356 to shift the same in a rightward direction against the wedge member 350. The support member 352 is inclined in such a manner that as a wedge member passes thereover in a rightward direction it will move closer to the ports 348, creating a variable orifice between the ports and wedge member which decreases the effective flow area between the bores 358 and the intertube space 347.

After the load exerted on the pison 339 and rod assembly 340 has been dissipated a spring 366 disposed within the inner tube will return the piston and rod assembly to the position illustrated in FIG. 9. With the pressure decreasing in the chamber 344 the springs 354 will return the wedge to its initial position. It can thus be seen that the instant embodiment will vary the effective flow area between the chambers in a manner which will achieve substantially the same results as that disclosed in the other embodiments.

Figure 11:
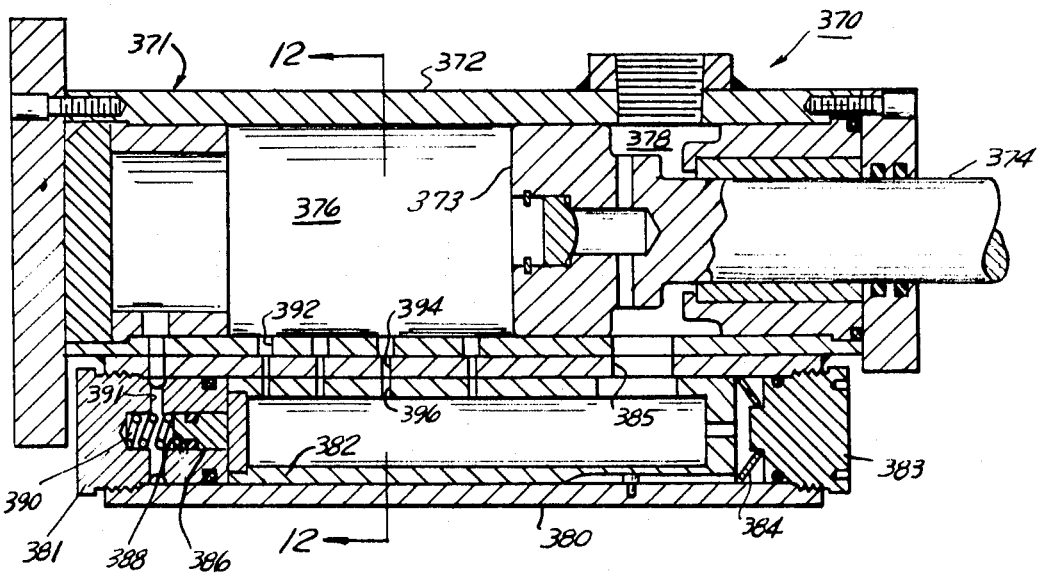
FIG. 11 is yet another embodiment of the present invention in which the restrictive means is in a side by side relationship with the sliding piston.

Referring now to FIG. 11 wherein there is shown another embodiment of the present invention, a shock absorber 370 comprising a housing 371 having a piston 373 and rod assembly 374 slidably mounted in a tube section 372 separating the tube into a pair of variable volume chambers 376 and 378. The tube 372 in a side by side relationship with a second tube 380 in which there is provided a slidably mounted intermediate tube 382 having on one end thereof a Belleville type spring 384 or other suitable biasing means which bias the intermediate tube toward the base end of the housing. The tube 380 is enclosed at opposite ends by threaded plugs 381 and 383. To the left of the intermediate tube there is provided an actuating member 386 which is slidably mounted within a a bore 388 formed within the plug 381. The walls of the bore 388 and the surface of the actuating pin 386 form an expandable pressure chamber 390 which is connected to the variable volume chamber 376 through drilled passageway 391. A shock load exerted on the piston 373 and rod assembly 374 will shift the piston inwardly, compressing the chamber 376 causing an increase in the pressure therein which is transmitted to the pressure chamber 390 and exerted against the actuating pin 386 so as to shift the intermediate tube 382 rightwardly to effect a reduction of orifice area for any shock load above a predetermined minimum magnitude.

A plurality of axially spaced ports extend through the tubes and are indicated by the numerals 392, 394 and 396, It can be seen that as pressure is exerted against the actuating pin 386 to shift the intermediate tube in a rightwardly direction the ports 396 will be out of radial alignment with the other hereinbefore mentioned ports thereby decreasing the effective flow area between the inner sides of the chamber 376 and tube 382. A bore 385 extending through the walls of the tubes connects the chamber 378 with the tube 382.

Thus as the piston 373 and rod assembly 374 is shifted leftwardly due to the application of a shock load thereon, the piston will successively cross over the ports 392, thereby decreasing the rate of flow from the chamber 376. Fluid will flow from the chamber 376 through the ports 392, 394 and 396 and return to the chamber 378 via the ports 385. As the pressure in the chamber 376 is increased due to the initial piston movement, there will be a corresponding increase in the pressure exerted against the actuating member 386 which will shift the intermediate tube rightwardly, thus further closing the effective flow area across the ports 392–396. It can thus be seen that the instant embodiment operates in a manner which is substantially the same as the other embodiments described hereinbefore.

It can also be seen that the present invention has provided a fluidic shock absorber which is adapted to operate under a variety of load conditions and which automatically compensates for the changes in the loads applied thereon.

Having thus described my invention, I claim:

1. A fluid shock absorber comprising:
a housing having an outer tube and an inner tube disposed in said outer tube and spaced apart therefrom, said inner tube being provided with a plurality of spaced ports extending from its inner to its outer side;
a piston slidably mounted within said inner tube separating said inner tube into variable volume chambers;
a rod secured to said piston and extending outwardly from one end of said housing for receiving a shock load, said piston moving to said load to decrease the volume of one of said chambers creating a pressure therein which is a function of the shock load, the fluid in said one chamber being forced from said one chamber through spaced ports when said piston is moved, said piston successively closing communication between said one chamber and said spaced ports as said piston movement decreases the volume of said one chamber;
restrictive means disposed adjacent said spaced ports between said inner and outer tubes and associated with said spaced ports at the outer side of said inner tube and operative to control the effective flow area of said spaced ports and thus the degree of fluid exhaust from said one chamber so as to control the deceleration of the piston as the shock load is dissipated by forcing the fluid from said one chamber;
means responsive to the pressure condition in said one chamber for shifting said inner tube and said restrictive means relative to one another for controlling the effective flow area of said spaced ports and thus the degree of fluid exhaust from said one chamber as the pressure therein increases to and above a predetermined value; and automatically variable biasing means opposing the operation of said pressure responsive means.

2. In combination with a fluid shock absorber of a type having: a tube; a piston slidably mounted in said tube and separating same into variable volume chambers; a rod secured to said piston and extending outwardly from one end of said tube for receiving a shock load, said piston moving in response to said load to decrease the volume of one of said chambers creating a pressure therein which is a function of the shock load; a side wall of said tube having a plurality of spaced ports through which fluid is forced from said one chamber when the piston is moved said piston successively closing communication between said one chamber and said space ports as said piston movement decreases the volume of said one chamber; destrictive means adjacent said ports and operative to control the effective flow area thereof and thus the degree of fluid exhaust from said one chamber so as to control the deceleration of the piston as the shock load is dissipated by forcing the fluid from said one chamber, wherein the improvement comprises: means responsive to the pressure condition in said one chamber for relatively moving the restrictive means and the ports to control the effective flow area of said ports and thus the degree of fluid exhaust from said one chamber as the pressure therein increases to and above a predetermined value; and an automatically variable biasing means opposing the operation of said pressure responsive means.

3. A combination as described in claim 2 and including means for adjusting the operative forces of said biasing means.

4. A combination as described in claim 2 wherein said restrictive means comprises a member adjacent the ports defining an orifice between the ports and said member; and means responsive to the pressure condition in said one chamber for decreasing the size of said orifice as the pressure in said one chamber increases to and above a predetermined value.

5. A combination as described in claim 4 wherein said member is of a wedge shape having a planar surface adjacent said ports for forming said orifice; an inclined support for said wedge member; means responsive to the pressure in said one chamber for moving said member longitudinally of said support for varying the distance between said ports and said planar surface so as to decrease the size of said orifice as the pressure in said one chamber increases; and means for biasing said wedge member so as to tend to increase the size of said orifice.

6. A combination as described in claim 2 including a first tube, said tube being provided with said plurality of spaced ports extending from the inner to its outer side, said piston being slidably mounted in said first tube and separating said tube into said variable volume chambers; said restrictive means comprising a second tube disposed in axial alignment and in side by side relationship with said first tube and being shiftable relative thereto, said second tube having a second plurality of ports extending therethrough form its inner to its outer side, the adjacent openings of said first and second tube ports being in substantially radial alignment when no shock load is applied to said rod.

7. A combination as described in claim 6 wherein one end of said second tube is responsive to pressure acting thereon and to shift said second tube axially relative to said first tube; and passage means connecting the pressure in said one chamber to said one end of said second tube whereby the ports of said first and second tubes are radially misaligned for decreasing the effective flow area of said first tube ports when the pressure in said one chamber increases to and above a predetermined value.

8. A combination as described in claim 6 wherein said first and second tubes are rotatably shiftable relative to one another about their own axes so as to radially misalign said first tube ports with said second tube ports whereby the effective flow area of said first tube ports is decreased as the pressure in said one chamber increases to and above a predetermined value.

9. A combination as described in claim 8 including means for preventing rotation of said first mentioned tube; spline means formed on one end of said second tube; a pressure responsive linear actuator adapted to cooperate with said spline means for rotating said second tube in response to pressure acting on one end of said actuator to radially misalign said first and second ports; means connecting said one end of said actuator to the pressure in said one chamber; and biasing means opposing movement of said actuator so as to tend to maintain said ports in radial alignment.

10. A fluid shock absorber comprising:
a housing having an outer tube and an inner tube disposed in said outer tube and spaced apart therefrom, said inner tube being provided with a plurality of spaced ports extending from its inner to its outer side;
a piston slidably mounted in said inner tube separating said inner tube into variable volume chambers;
a rod secured to said piston and extending outwardly from one end of said housing for receiving a shock load, said piston moving in response to said load to decrease the volume of one of said chambers creating a pressure therein which is a function of the shock load, the fluid in said one chamber being forced from said one chamber through said spaced ports when said piston is moved, said piston successively closing communicator between said one chamber and said spaced ports as said piston movement decreases the volume of said one chamber;
restrictive means comprising an intermediate tube disposed in said space between said inner and outer tubes and shiftable relative to said inner tube, said restrictive means being associated with said spaced ports and operative to control the effective flow area of said spaced ports and thus the degree of fluid exhaust from said one chamber so as to control the deceleration of the piston as the shock load is dissipated by forcing the fluid from said one chamber, said intermediate tube having a plurality of second ports extending therethrough from its inner to its outer side adjacent the ports of said inner tube and being in substantial radial alignment with said inner tube ports when no shock load is applied to said rod;
means responsive to the pressure condition in said one chamber for controlling the effective flow area of said spaced ports and thus the degree of fluid exhaust from said one chamber as the pressure therein increases to and above a predetermined value; and
a resilient biasing means opposing the operation of said pressure responsive means.

11. A combination as described in claim 10 including means for preventing relative movement between said inner and outer tubes.

12. A combination as described in claim 10 wherein said intermediate tube is spring biased to tend to maintain said inner and intermediate ports in radial alignment.

13. A combination as described in claim 10 including accumulator means connected to the space between said intermediate and outer tubes.

14. A combination as described in claim 10 wherein said inner and intermediate tubes are rotatably shiftable relative to one another about a common axis; and means for relatively rotatably shifting said tubes so as to radially misalign said inner and intermediate tube ports.

15. A combination as described in claim 14 including means for preventing relative movement between said inner and outer tubes; splined means formed on one end of said intermediate tube; a pressure responsive linear actuator adapted to cooperate with said spline means for rotating said intermediate tube in response to pressure acting on one end of said actuator to radially misalign said inner and outer ports; means connecting said one end of said actuator to the pressure in said one chamber; and biasing means opposing the movement of said actuator so as to tend to maintain said ports in radial alignment.

16. A combination as described in claim 10 wherein one end of said intermediate tube is in a fluid sealing engagement with said inner and outer tubes and is responsive to pressure to shift said intermediate tube axially relative to said inner tube; and passage means connecting the pressure in said one chamber to said intermediate tube end whereby the ports in said intermediate tube will become misaligned with said inner tube ports for decreasing the effective flow area thereof responsive to a predetermined pressure increase in said one chamber.

17. A combination as described in claim 16 including means for preventing relative movement between said inner and outer tubes.

18. A combination as described in claim 10 including means preventing relative movement between said outer and intermediate tubes; said inner tube having one end thereof in fluid sealing engagement with said intermediate tube and responsive to increases in the pressure in said one chamber to shift said inner tube ports out of radial alignment with said intermediate ports whereby the effective flow area of said inner tube ports is decreased as the pressure in said one chamber increases to and beyond a predetermined value.

19. A combination as described in claim 18 including spring means biasing said inner tube so as to maintain said ports in substantially radial alignment.

20. A combination as described in claim 18 including accumulator means in communication with the space between said intermediate and outer tubes, said accumulator being disposed within said outer tube.

References Cited
UNITED STATES PATENTS

| | | | |
|---|---|---|---|
| 1,613,782 | 1/1927 | Bauer | 188—97.1 |
| 3,207,270 | 9/1965 | Ellis, Jr. | 188—96.2X |
| 3,344,894 | 10/1967 | Kenworthy | 188—88.53X |
| 3,419,114 | 12/1968 | Rumsey | 188—97 |
| 3,446,317 | 5/1969 | Bogdan | 188—88.53 |

FOREIGN PATENTS

| | | | |
|---|---|---|---|
| 1,065,383 | 1/1954 | France | 188—88.51 |

GEORGE E. A. HALVOSA, Primary Examiner

U.S. Cl. X.R.

188—314, 318

UNITED STATES PATENT OFFICE
CERTIFICATE OF CORRECTION

Patent No. 3,605,960            Dated December 17, 1971

Inventor(s) Jerome R. Singer            (SJQ-100-A)

It is certified that error appears in the above-identified patent and that said Letters Patent are hereby corrected as shown below:

Col. 1, line 22, change "varynig" to --varying--

Col. 2, line 36, change "form" to --from--

Col. 5, line 6, change "it" to --is--

Col. 7, line 21, delete "195"

Col. 8, line 52, change "pison" to --piston--

Col. 9, line 3, change "expandible" to --expansible--

Col. 9, line 14, after "396" change "," to --.--

Col. 9, line 55, after "moving" insert --in response--

Col. 10, line 16, insert a comma after "moved"

line 19, change "destrictive" to --restrictive-- line 62, change "form" to --from--

Col. 11, line 33, change "communicator" to --communication--

Signed and sealed this 18th day of April 1972.

(SEAL)
Attest:

EDWARD M. FLETCHER, JR.          ROBERT GOTTSCHALK
Attesting Officer                 Commissioner of Patents